April 15, 1958     J. F. JOHNSON     2,830,840
GAMBREL
Filed Dec. 13, 1954
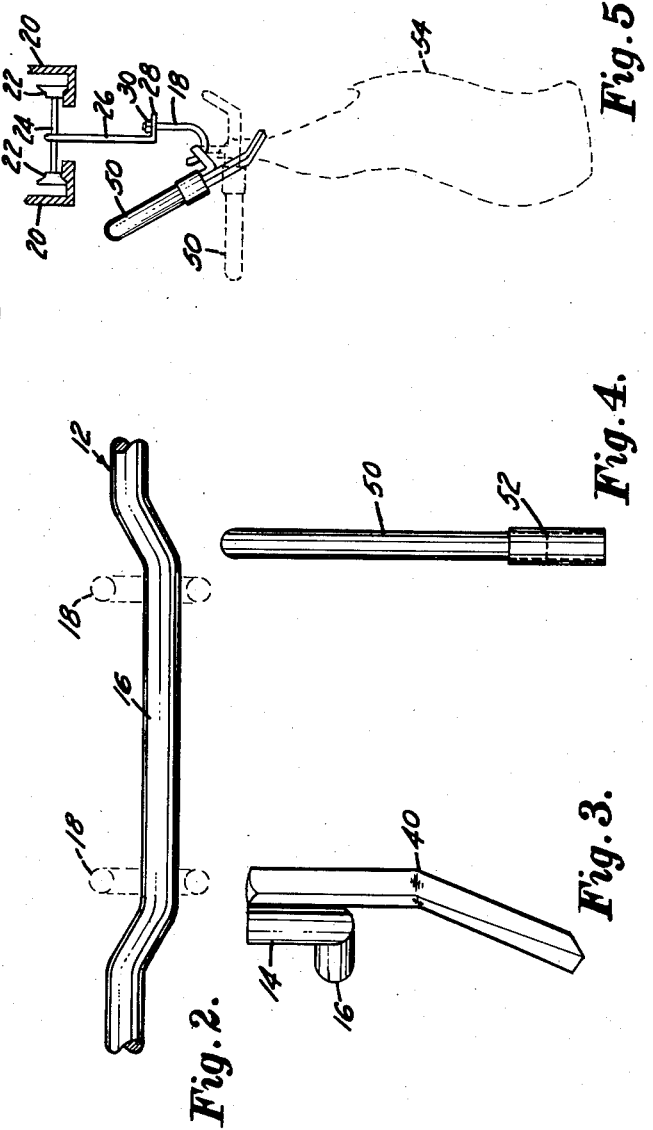
INVENTOR.
John F. Johnson United States Patent Office 2,830,840
Patented Apr. 15, 1958

2,830,840
GAMBREL
John F. Johnson, Omaha, Nebr.
Application December 13, 1954, Serial No. 474,899
1 Claim. (Cl. 294—79)

This invention relates to slaughter house tools and more particularly to a hanger rack for livestock.

The meat processing industry has a well-known difficulty in that the carcasses of the animals are extremely heavy and hard to lift and carry. This is particularly true of hog carcasses since before cutting the animal into the two initial portions the carcass must be passed through a bath of boiling water in order to remove the hair. This has in the past been accomplished by passing hooks, one each between the tendons and the shin bone of the hind legs of the animal before the bath. In this manner an opening through the skin of the animal is made and the hot boiling water, frequently polluted, is allowed to enter the opening at this point and it then penetrates farther into the leg. It therefore frequently happens that this particular portion must be discarded since it not only is discolored by the warm or hot water but also deteriorates from the bacteria thus allowed to penetrate to the raw flesh. Since this represents a large waste in the operation of the slaughter house it is a main object of this invention to provide a livestock hanger rack which grips the hind legs of the animal without puncturing the skin.

It is another object of the invention to provide a hanger bar so constructed that at times when a lever bar is applied thereto the rack may be pivoted or rotated allowing the legs of the animal to slide freely therefrom.

It is yet another object of the invention to provide a cross bar of the rack with an offset portion to cooperate with the hangers descending from the overhead conveyor systems used in the majority of slaughter houses whereby the animal is held in a fixed relation to the hanger and further whereby the rack may be easily removed from the hanger.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:

Figure 1 is a front elevational view of the hanger rack.

Figure 2 is a top plan view of a medial portion of a hanger bar.

Figure 3 is an end view of the hanger rack.

Figure 4 is an elevational view of a lever bar used in conjunction with the invention.

Figure 5 is an end view of the invention shown suspended from the roller hook of a conveyor track. The upper end of the conveyor track is broken away and a hog carcass is shown in dotted lines slung from the rack with the lever bar shown applied in the position of use. A second position of the rack and lever bar is shown by means of dotted lines, such as it would assume when the legs of the hog are removed from hook portions as later described.

In the accompanying drawings, and in the following specification, the same reference characters are used to designate the same parts and elements throughout and in which the numeral 10 refers to the invention in its entirety, and 12 indicates a hanger bar or cross bar, which as shown in Figure 1, is turned upwardly at a right angle at its outward ends 14 and as shown in Figure 2 is formed with an offset medial portion 16.

The offset medial portion 16 is provided to cooperate with two spaced apart hooks 18 shown in dotted lines in Figure 2 and one of which is shown in end view in Figure 5. Also shown in Figure 5 is an overhead conveyor system conventional to slaughter houses consisting of two spaced apart angle tracks 20 firmly suspended by means not shown from the ceiling of the slaughter house. Two rollers 22 are journalled upon a shaft 24 and positioned within the tracks 20. The shaft 24 extends through an upper end of a downwardly extended bar 26 which latter is turned outwardly at a right angle as at 28 and is there provided with an aperture through which the upward ends of the hooks 18 are passed. Nuts 30 threaded to the upward end of the hooks firmly secure the hooks in a depended position with respect to the bar 26.

The forked leg retainers or hooks 32 and 34, depending from the end of the cross bar 12, are formed with vertically disposed inner arms 36 and angularly disposed outer arms 38. The arms are designed to substantially form a V-shaped hook at each end of the cross bar, and inclined lower ends of the hooks are positioned whereby the center of gravity of an animal suspended by legs thereof from the V-shaped hooks is in a vertical plane extended through the longitudinal axis of the offset portion of the cross bar. The upper portions of the arms of the hooks are positioned in a first vertical plane, and the first vertical plane is parallel to a second vertical plane which extends through the longitudinal axis of the cross bar. The inclined lower ends of the inner and outer arms of the hooks are bent forwardly at an angle of approximately fifteen degrees with respect to the upward portion and in the same direction as the formerly described offset portion 16 of the hanger or cross bar 12. The forward bend of the inward tine is best illustrated in Figure 3.

The lower ends of the inward tines 36 are bent outwardly at an acute curve whereby a crotch 42 is formed. As best shown in Figure 1 the lower end of each outward tine 38 is joined to the crotch 42 at an angle of approximately twenty degrees as indicated at 44. The lower ends of the outward tines 38 are extended upwardly therefrom, the outer tines 38 are further bent approximately at their medial portion as at 46, whereby the upward portion of the outer tines is positioned at approximately thirty degrees as indicated at 48 and with respect to the inner tines 36.

In this manner with the offset portion 16 disposed within the pairs of hooks 18 depended from the conveyor system of the slaughter house, a hog carcass which is indicated at 54 with its two legs inserted into the forked leg retainers will be slung with its center of gravity directly below the axis of the offset center portion 16, thus causing the forked leg retainers to be pointed forwardly and canted at an angle with respect to the vertical. A balance is thus provided whereby at times when the legs of the hog carcass are to be slipped out of the forked leg retainers a slaughter house worker need only to pivot the leg retainers counterclockwise about the hooks 18.

A handle lever, such as shown in Figure 4 at 50 is provided for this purpose having a socket or tube 52 secured to one of its ends whereby it may be slipped over the outer tines 38 of the leg retainers thus providing the worker with leverage for turning the assembly to its dotted line position as shown in Figure 5, whereby the legs of the hog carcass easily slide outwardly of the forks 32 and 34.

It can also be seen that by detaching the hanger bar from the hooks 18 the legs of a hog carcass may be inserted in the forks 32 and 34, which latter are formed with one corner of the squared bars turned inwardly whereby a firm and sharp grip is taken upon the hog's legs and with the weight of the hog depending in the position as shown in Figure 5 the weight of the hog is used to tighten the grip of the forked retainers, the legs of smaller animals are, when engaged, positioned closer to the crotch of the retainers in a like manner.

In this manner the hog's legs are firmly held and without resorting to puncturing the animal's legs in order to suspend it from a conveyor system as heretofore.

In essence this invention, while simple in construction, has provided an arrangement of members shaped to cooperate with each other whereby the weight of the hog is utilized to maintain a firm yet non-rupturing grip, with the described offset center portion 16 positioned in such a manner that the center of rotation will be in a vertical alignment with the center of gravity of the hog carcass and with the forked leg retainers canted forwardly for firmly gripping the hog legs.

The shape and formation of the members have thus provided means for quickly slipping the hog legs away from the retainer at times when the hog carcass is to be taken from the conveyor.

It will be seen that the inner and outer tines 36 and 38 form a leg-engaging portion having a notch therebetween. The walls of the notch are the innermost edges of the tines 36 and 38. The notches are open at their wider outer ends for receiving the hind legs as above described.

In a broad sense the medial portion 16 together with those portions adjacent the numeral 14 in the drawing which connect the medial off-set portion 16 and tines 36, together form a supporting portion disposed between and connected to the leg-engaging portions defined by the tines 36 and 38. Such a supporting portion has a suspension section disposed between its ends and in the example shown in the drawings, the suspension section is defined by the middle of the portion 16.

It will be seen that the supporting portion is thus defined as being those parts of the gambrel which are disposed between the tines 36, and is so shaped that when the supporting portion is upheld in its suspension or medial section 16, with the legs of an animal held in between the tines 36 and 38, then the walls of the notches defined by the tines 36 and 38 normally lie in planes disposed at acute angles and at substantial inclinations respectively and with respect to both the vertical and the horizontal.

Expressed in another way the lowermost portions of the tines 36 and 38, which latter are disposed beneath the bends at 40 and 46, are specifically inclined at an angle of approximately 45° with respect to the vertical and horizontal at times when the animal is held in the lower ends of the tines 36 and 38.

In a narrow sense the actual functioning notch at the time the animal is hung in the gambrel is that part of the notch which is below the bends 40 and 46. It is this part which is disposed at a substantial inclination with respect to the vertical and the horizontal and at preferably an acute angle with respect to both the vertical and the horizontal, and still further preferably at 45° with respect to the vertical and the horizontal.

In a broad sense the hand lever 50, though removable, can be considered a part of the gambrel. It is important that this hand lever extend a substantial distance away from the pivotal attachment between the hook 18 and the medial or suspension section 16 for providing substantial leverage. It is preferred that the lever 50 extend upwardly from the point at the hook 18.

From the foregoing description, it is thought to be obvious that a livestock rack constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

In a gambrel, the combination which comprises a horizontally disposed cross bar, the intermediate portion of which is offset in a horizontal plane and the length of the offset being sufficient to accommodate a pair of conventional hooks of an overhead conveyor system of a slaughterhouse, vertically disposed inner arms depending from ends of the cross bar, angularly disposed outer arms extended from lower ends of the inner arms and substantially forming V-shaped hooks at each end of the cross bar, the inner and outer arms being integral and the lower ends of the inner and outer arms being connected by substantially semi-circular portions, the inner and outer arms being square in cross section and upper portions of said arms being in a first vertical plane parallel to a second vertical plane through the longitudinal axis of the cross bar, and the offset portion of the cross bar being in a plane positioned at a right angle to the said first vertical plane through the upper portions of the inner and outer arms, corners of the square inner and outer arms being extended inwardly for gripping legs of animals suspended by the gambrel and lower portions of said inner and outer arms being inclined at an acute angle to said first vertical plane, said inclined lower portions of the hooks being extended on the side of the first vertical plane on which the offset portion of the cross bar is positioned, and a vertical plane through the offset portion of the cross bar being spaced from a vertical plane through the main portion of the cross bar so that with the gambrel suspended from spaced hooks by the offset portion of the cross bar, a vertical plane through the longitudinal axis of the offset portion of the cross bar is positioned on the center of gravity of an animal suspended from the hooks of the gambrel by the legs thereof, and the inclination of the lower ends of the arms providing for the release of the animal carried by the gambrel upon rotation of the gambrel about the axis of the offset portion of the cross bar in a counter-clockwise direction, whereby the legs of the animal slide from the hooks releasing the animal.

References Cited in the file of this patent

UNITED STATES PATENTS

| | | |
|---|---|---|
| 470,851 | Vose | Mar. 15, 1892 |
| 812,861 | Martin | Feb. 20, 1906 |
| 1,036,297 | Meister | Aug. 20, 1912 |
| 1,742,569 | Barker et al. | Jan. 7, 1930 |
| 2,405,638 | Bilek | Aug. 13, 1946 |
| 2,533,941 | Johnson | Dec. 12, 1950 |
| 2,564,630 | Thorman | Aug. 14, 1951 |
| 2,649,616 | Swanson | Aug. 25, 1953 |